United States Patent
Berger

(10) Patent No.: US 8,181,388 B2
(45) Date of Patent: May 22, 2012

(54) LIQUID SEED DRESSING METHOD FOR DRESSING SMALL QUANTITIES OF SEED

(75) Inventor: Richard A. Berger, Claymont, DE (US)

(73) Assignee: E.I. Du Pont De Nemours and Company, Wilmington, DE (US)

( * ) Notice: Subject to any disclaimer, the term of this patent is extended or adjusted under 35 U.S.C. 154(b) by 0 days.

(21) Appl. No.: 12/678,090

(22) PCT Filed: Sep. 14, 2007

(86) PCT No.: PCT/US2007/078581

§ 371 (c)(1),
(2), (4) Date: Jul. 8, 2010

(87) PCT Pub. No.: WO2009/035462

PCT Pub. Date: Mar. 19, 2009

(65) Prior Publication Data

US 2010/0275511 A1    Nov. 4, 2010

(51) Int. Cl.
*A01C 1/00* (2006.01)
(52) U.S. Cl. .................................. 47/58.1 SE
(58) Field of Classification Search ............ 47/58.1 SE, 47/14, 57.6, 57.7, 58.1 R; 427/214, 200, 427/242, 359; 426/309
See application file for complete search history.

(56) References Cited

U.S. PATENT DOCUMENTS

| | | | | |
|---|---|---|---|---|
| 2,579,734 A * | 12/1951 | Burgesser | ...................... | 47/57.6 |
| 3,862,325 A * | 1/1975 | Plowman | ...................... | 514/451 |
| 4,465,017 A * | 8/1984 | Simmons | ...................... | 118/418 |
| 4,657,773 A * | 4/1987 | Mueller | ............................. | 427/4 |
| 4,703,713 A | 11/1987 | Gago et al. | | |
| 4,806,357 A * | 2/1989 | Garrett et al. | ...................... | 427/4 |
| 5,509,963 A * | 4/1996 | Kohno | ............................. | 118/23 |
| 5,950,360 A | 9/1999 | Heinrich et al. | | |
| 6,099,160 A * | 8/2000 | Flackett | ........................ | 366/217 |
| 6,449,869 B1 | 9/2002 | Bretschneider et al. | | |
| 6,745,512 B1 * | 6/2004 | Panzer et al. | ...................... | 47/1.3 |
| 6,755,565 B2 * | 6/2004 | Flackett | ........................ | 366/217 |
| 2004/0118040 A1 * | 6/2004 | Asrar et al. | ...................... | 47/57.6 |
| 2004/0128908 A1 * | 7/2004 | Neumann | ...................... | 47/57.6 |
| 2004/0237395 A1 * | 12/2004 | Legro et al. | .............. | 47/58.1 SE |
| 2006/0073193 A1 * | 4/2006 | Marcussen et al. | ........... | 424/442 |
| 2007/0064523 A1 | 3/2007 | Wilson | | |

FOREIGN PATENT DOCUMENTS

WO    WO 97/36471    10/1997

OTHER PUBLICATIONS

International Search Report for International Application No. PCT/US2007/078581.
Written Opinion of the International Searching Authority for International Application No. PCT/US2007/078581.
FlackTek Inc. SpeedMixer™; DAC150 FVZ (2 pgs.) http://www.speedmixer.com/dac150fvz.htn Cited visited Nov. 5, 2008.
FlackTek Inc. SpeedMixer™; DAC150FVZ by Hauschild, Germany; Features (1 pg.).

* cited by examiner

*Primary Examiner* — Rob Swiatek
*Assistant Examiner* — Ebony Evans
(74) *Attorney, Agent, or Firm* — Alston & Bird LLP

(57) ABSTRACT

A method of dressing seeds is disclosed. The method utilizes a seed treatment slurry which is applied to seed by subjecting the seed and seed treatment slurry to a dual asymmetrical centrifugal mixing motion. The method provides uniformly dressed seeds and is suitable for dressing small seed lots.

20 Claims, No Drawings

US 8,181,388 B2

LIQUID SEED DRESSING METHOD FOR DRESSING SMALL QUANTITIES OF SEED

FIELD OF THE INVENTION

The present invention relates to methods of treating seed lots with a seed dressing and, in particular, this invention relates to methods of dressing relatively small amounts of seed.

BACKGROUND OF THE INVENTION

Seeds have been treated with a wide variety of enhancement chemicals and other materials for decades. The recent development of transgenic crops has resulted in an increased focus on seed treatment, because of the increased value of such genetically-modified seeds.

Both continuous and batch seed treaters are known to the art. Most continuous treaters are industrial scale and are designed to efficiently treat relatively large seed lots (i.e., thousands of pounds of seed). Smaller seed lots have traditionally been treated using laboratory batch treaters. Spinning disc treaters like the Hege 11, are popular and utilize different size dressing bowls to treat seed batch sizes from 20 grams up to 3000 grams. The liquid seed dressing dose is delivered to the rotating seed using a syringe barrel or other dispensing device. Rotating pots, drums or pans are effective to treat small seed batches ranging from 25 grams to several 100 lbs. The liquid seed dressing is typically atomized onto the rotating seed surface or delivered by a drip tube. Automizing or misting the liquid seed dressing onto seed can result in off target spray. Misting applies a liquid seed dressing gradually. The coating is built up over time while the seed continuously tumbles. Heavier seed kernels like corn, can begin to rub off the coating as seed to seed contact causes coating abrasion. This technique can become counter productive as the process proceeds. Seed dressing equipment, particularly dressing implements that are not disposable such as atomization nozzles, pots, dressing containers, ventillated enclousures, etc. which become contaminated during the application process must be thoroughly cleaned before a different liquid seed dressing is applied. For small seed lots this can become laborious, time consuming and highly variable depending on the operators experience level. For seed lots of less than 20 grams, comprised of only a few kernels of seed, for example, 10-40 seeds—there are no suitable, exacting reproducible treatment methods. The dilemma of applying a liquid seed dressing to only a few kernels can be delicate and awkward for a treater.

These small seed lots, such as genetically-modified seeds, are often extremely valuable. Examples of these small seed lots include parent seeds (e.g., breeders, foundation, registered), hand-produced hybrid seeds, and vegetable seeds. These small seed lots must be treated uniformly with fungicides, insecticides and other materials to eliminate losses from diseases, insects and harsh conditions. Oftentimes these small seed lots are treated by shaking the seeds in a jar performed by laboratory personnel. The inner walls of the jar can be coated with as much liquid seed dressing as the seeds themselves resulting in non-uniform and inconsistent application of the liquid seed dressing dose. Every individual is different and the implements and conditions in which they apply liquid seed dressing to small seed lots can vary greatly in practice. In addition, laboratory personnel may experience ergonomic trauma to their wrists as a result of hand shaking large numbers of seed lots over time. Unwanted residual chemical carryover between high value seed lots must be eliminated. Heretofore, systems for the treatment of small seed lots have used inefficient protocols and equipment which have failed to eliminate carryover. Accordingly, these protocols and equipment often resulted in seed lots, which were not treated uniformly and/or were contaminated with carryover seed and/or treatment materials.

Dry application seed treatment formulations are dusty and can present unacceptable worker exposure to air borne and particulate active ingredients. Liquid systems, particularly those that are aqueous based are preferred. Certain liquid formulations can become inhomogeneous on storage, such that particle size or viscosity do not remain constant. Additional problems can arise such as unacceptable drying times, material build-up in the seed treater, low seed flowability, poor seed coverage and dust-off of the active ingredient from the seed prior to planting. As a result, handling is rendered difficult and the biological efficacy and integrity of the seed treatment is reduced.

Uniformity of application is particularly important when testing new active ingredients. Currently available treaters often require relatively large amounts of active ingredients for application to the seeds. This becomes an issue when the new active ingredients have a high economic value on a per gram basis and supply is limited. Currently available treaters present challenges in testing these new active ingredients over a range of active ingredient doses applied to multiple seed types in order to determine their optimal dosages and seed response. Thus, uniformity of application is particularly important when testing new active ingredients.

Accordingly, there is then a need for seed treatment methods that eliminate contamination from carryover seed and/or treatment materials in small seed lots and provide uniformly covered seeds having high biological efficacy post planting. There is also a need for protocols and equipment that are user friendly, easy to load and treat with, which allow operators to focus on other attributes of the seed treatment besides the application process.

SUMMARY OF THE INVENTION

Seed treatment methods are disclosed that quickly treat small seed lots providing uniformly covered seeds, which have high biological efficacy post planting. A method of dressing a small seed lot is provided. The method includes providing a small seed lot to be dressed; providing a liquid composition to be applied to said small seed lot; and applying a dual asymmetrical centrifugal mixing motion to the small seed lot and the liquid composition for a sufficient amount of time to surface coat the seeds in the small seed lot. The dual asymmetrical centrifugal mixing motion causes said liquid composition to uniformly spread and subsequently dry onto each seed surface in said small seed lot. Virtually any seat type can be dressed. For example, treatable seeds include, but are not limited to those from, maize, wheat, barley, rice, sorghum, rye, millet, cotton, safflower, rape seed, sunflower, *Brassica*, alfalfa, palm, coconut, flax, castor, olive guar, locust bean, fenugreek, soybean, garden beans, cowpea, mungbean, lima bean, fava bean, lentils, and chickpea. The liquid composition is made up of one or more active ingredients including herbicides, insecticides, fungicides, bactericides, nematicides, molluscicides, or mixtures thereof. Additional materials may also be present in the seed treatment slurry including carriers, surfactants, dyes, pigments, growth regulators, dispersants, film-forming polymers, anti-caking agents, foam-control agents, or mixtures thereof. The small seed lots may contain anywhere from 1 to 10,000 seeds. The dual asymmetrical centrifugal mixing motion is by a FlackTek Model 150

FVZ-K SpeedMixer. The small seed lot and the liquid composition weighs between 0 and 100 grams.

DETAILED DESCRIPTION OF THE INVENTION

In the description that follows, a number of terms are used extensively. The following definitions are provided to facilitate understanding of the embodiments.

For purposes of the present description the term "seed" is not limited to a particular type of seed and can refer to seed from a single plant species, a mixture of seed from multiple plant species, or a seed blend from various strains within a plant species. The described methods can be utilized to treat gymnosperm seed, dicotyledonous angiosperm seed and monocotyledonous angiosperm seed. The seed treatment methods according to the present invention can be particularly useful for treatment of seed which will be utilized in applications including but not limited to home gardening, crop production, forestry applications, and government rehabilitation programs.

The methods of this invention may be used to treat or dress seeds of virtually all plant species. Suitable seeds for dressing using the methods of the present invention include seeds of wheat, durum wheat, barley, oat, rye, maize, sorghum, rice, wild rice, cotton, flax, oil seed rage, sunflower, safflower, soybean, millet, garden bean, lima bean, broad bean, guar, locust bean, fenugreek, cowpea, mungbean, fava bean, lentils, chickpea, garden pea, peanut, alfalfa, palm, coconut, castor, olive, beet, garden lettuce, cole crop, turnip, leaf mustard, black mustard, tomato, potato, pepper, eggplant, tobacco, cucumber, muskmelon, watermelon, squash, carrot, zinnia, cosmos, chrysanthemum, sweet scabious, snapdragon, gerbera, babys-breath, statice, blazing star, lisianthus, yarrow, marigold, pansy, impatiens, petunia, geranium and coleus.

In particular, seeds of interest include, but are not limited to those from, corn (*Zea mays*), *Brassica* sp. (e.g., *B. napus*, *B. rapa*, *B. juncea*), particularly those *Brassica* species useful as sources of seed oil, alfalfa (*Medicago sativa*), rice (*Oryza sativa*), rye (*Secale cereale*), sorghum (*Sorghum bicolor*, *Sorghum vulgare*), millet (e.g., pearl millet (*Pennisetum glaucum*), proso millet (*Panicum miliaceum*), foxtail millet (*Setaria italica*), finger millet (*Eleusine coracana*)), sunflower (*Helianthus annuus*), safflower (*Carthamus tinctorius*), soybean (*Glycine max*), tobacco (*Nicotiana tabacum*), potato (*Solanum tuberosum*), peanuts (*Arachis hypogaea*), cotton (*Gossypium barbadense*, *Gossypium hirsutum*), sweet potato (*Ipomoea batatus*), cassava (*Manihot esculenta*), coffee (*Coffea* spp.), coconut (*Cocos nucifera*), pineapple (*Ananas comosus*), citrus trees (*Citrus* spp.), cocoa (*Theobroma cacao*), tea (*Camellia sinensis*), banana (*Musa* spp.), avocado (*Persea americana*), fig (*Ficus casica*), guava (*Psidium guajava*), mango (*Mangifera indica*), olive (*Olea europaea*), papaya (*Carica papaya*), cashew (*Anacardium occidentale*), macadamia (*Macadamia integrifolia*), almond (*Prunus amygdalus*), sugar beets (*Beta vulgaris*), sugarcane (*Saccharum* spp.), oats, barley, vegetables, ornamentals, and conifers.

Vegetable seeds of interest include tomatoes (*Lycopersicon esculentum*), lettuce (e.g., *Lactuca sativa*), green beans (*Phaseolus vulgaris*), lima beans (*Phaseolus limensis*), peas (*Lathyrus* spp.), and members of the genus *Cucumis* such as cucumber (*C. sativus*), cantaloupe (*C. cantalupensis*), and musk melon (*C. melo*). Ornamental seed of interest include azalea (*Rhododendron* spp.), hydrangea (*Macrophylla hydrangea*), hibiscus (*Hibiscus rosasanensis*), roses (*Rosa* spp.), tulips (*Tulipa* spp.), daffodils (*Narcissus* spp.), petunias (*Petunia hybrida*), carnation (*Dianthus caryophyllus*), poinsettia (*Euphorbia pulcherrima*), and chrysanthemum. Conifer seeds that may be employed in practicing the methods include, for example, pines such as loblolly pine (*Pinus taeda*), slash pine (*Pinus elliotii*), ponderosa pine (*Pinus ponderosa*), lodgepole pine (*Pinus contorta*), and Monterey pine (*Pinus radiata*); Douglas-fir (*Pseudotsuga menziesii*); Western hemlock (*Tsuga canadensis*); Sitka spruce (*Picea glauca*); redwood (*Sequoia sempervirens*); true firs such as silver fir (*Abies amabilis*) and balsam fir (*Abies balsamea*); and cedars such as Western red cedar (*Thuja plicata*) and Alaska yellow-cedar (*Chamaecyparis nootkatensis*).

Turfgrasse seeds include, but are not limited to: annual bluegrass (*Poa annua*); annual ryegrass (*Lolium multiflorum*); Canada bluegrass (*Poa compressa*); Chewings fescue (*Festuca rubra*); colonial bentgrass (*Agrostis tenuis*); creeping bentgrass (*Agrostis palustris*); crested wheatgrass (*Agropyron desertorum*); fairway wheatgrass (*Agropyron cristatum*); hard fescue (*Festuca longifolia*); Kentucky bluegrass (*Poa pratensis*); orchardgrass (*Dactylis glomerata*); perennial ryegrass (*Lolium perenne*); red fescue (*Festuca rubra*); redtop (*Agrostis alba*); rough bluegrass (*Poa trivialis*); sheep fescue (*Festuca ovina*); smooth bromegrass (*Bromus inermis*); tall fescue (*Festuca arundinacea*); timothy (*Phleum pratense*); velvet bentgrass (*Agrostis canina*); weeping alkaligrass (*Puccinellia distans*); western wheatgrass (*Agropyron smithii*); Bermuda grass (*Cynodon* spp.); St. Augustine grass (*Stenotaphrum secundatum*); zoysia grass (*Zoysia* spp.); Bahia grass (*Paspalum notatum*); carpet grass (*Axonopus affinis*); centipede grass (*Eremochloa ophiuroides*); kikuyu grass (*Pennisetum clandesinum*); seashore paspalum (*Paspalum vaginatum*); blue gramma (*Bouteloua gracilis*); buffalo grass (*Buchloe dactyloids*); sideoats gramma (*Bouteloua curtipendula*).

The above recited seeds are illustrative, and should not be considered limiting in any way. For economic reasons seed treatments of cotton, maize, soybean and rice are important embodiments of the invention. Any number of seeds can be dressed using the methods of the present invention including but not limited to from 1 to 10,000 seeds. For example, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, 500, 501, 502, 503, 504, 505, 506, 507, 508, 509, 510, 511, 512, 513, 514, 515, 516, 517, 518, 519, 520, 521, 522, 523, 524, 525, 526, 527, 528, 529, 530, 531, 532, 533, 534, 535, 536, 537, 538, 539, 540, 541, 542, 543, 544, 545, 546, 547, 548, 549, 550, 551, 552, 553, 554, 555, 556, 557, 558, 559, 560, 561, 562, 563, 564, 565, 566, 567, 568, 569, 570, 571, 572, 573, 574, 575, 576, 577, 578, 579, 580, 581, 582, 583, 584, 585, 586, 587, 588, 589, 590, 591, 592, 593, 594, 595, 596, 597, 598, 599, 600, 601, 602, 603, 604, 605, 606, 607, 608, 609, 610, 611, 612, 613, 614, 615, 616, 617, 618, 619, 620, 621, 622, 623, 624, 625, 626, 627, 628, 629, 630, 631, 632, 633, 634, 635, 636, 637, 638, 639, 640, 641, 642, 643, 644, 645, 646, 647, 648, 649, 650, 651, 652, 653, 654, 655, 656, 657, 658, 659, 660, 661, 662, 663, 664, 665, 666, 667, 668, 669, 670, 671, 672, 673, 674, 675, 676, 677, 678, 679, 680, 681, 682, 683, 684, 685, 686, 687, 688, 689, 690, 691, 692, 693, 694, 695, 696, 697, 698, 699, 700, 701, 702, 703, 704, 705, 706, 707, 708, 709, 710, 711, 712, 713, 714, 715, 716, 717, 718, 719, 720, 721, 722, 723, 724, 725, 726, 727, 728, 729, 730, 731, 732, 733, 734, 735, 736, 737, 738, 739, 740, 741, 742, 743, 744, 745, 746, 747, 748, 749, 750, 751, 752, 753, 754, 755, 756, 757, 758, 759, 760, 761, 762, 763, 764, 765, 766, 767, 768, 769, 770, 771, 772, 773, 774, 775, 776, 777, 778, 779, 780, 781, 782, 783, 784, 785, 786, 787, 788, 789, 790, 791, 792, 793, 794, 795, 796, 797, 798, 799, 800, 801, 802, 803, 804, 805, 806, 807, 808, 809, 810, 811, 812, 813, 814, 815, 816, 817, 818, 819, 820, 821, 822, 823, 824, 825, 826, 827, 828, 829, 830, 831, 832, 833, 834, 835, 836, 837, 838, 839, 840, 841, 842, 843, 844, 845, 846, 847, 848, 849, 850, 851, 852, 853, 854, 855, 856, 857, 858, 859, 860, 861, 862, 863, 864, 865, 866, 867, 868, 869, 870, 871, 872, 873, 874, 875, 876, 877, 878, 879, 880, 881, 882, 883, 884, 885, 886, 887, 888, 889, 990, 991, 992, 993, 994, 995, 996, 997, 998, 999, 1000, or greater seeds can be treated.

The term "active" as used herein shall, in general, be understood to mean any ingredient that is chemically active and/or biologically active in origin. In this regard an "active" ingredient can be a single ingredient or a combination of ingredients; and the meaning of the term "active" shall be understood to include but not be limited to the following:

(1) such arthropodicidally-active compositions-of-matter as are disclosed and listed in U.S. Pat. No. 5,093,853;

(2) such bactericidally-active compositions-of-matter as are disclosed in U.S. Pat. No. 4,182,716;

(3) such fungicidally-active compositions-of-matter as are disclosed in U.S. Pat. No. 4,182,716; U.S. Pat. No. 4,497,646; U.S. Pat. No. 4,569,690; U.S. Pat. Nos. 4,857,649 and 4,950,671; U.S. Pat. Nos. 4,966,912 and 5,061,716; U.S. Pat. Nos. 5,039,332 and 5,071,862; and U.S. Pat. No. 5,215,747;

(4) such herbicidally-active compositions-of-matter as those disclosed in U.S. Pat. No. 4,497,646; U.S. Pat. Nos. 4,569,690 and 4,927,451; U.S. Pat. No. 4,945,113; U.S. Pat. No. 4,966,910; U.S. Pat. No. 4,979,982 (to Brouwer et al.; U.S. Pat. No. 4,981,508; U.S. Pat. No. 5,114,464; U.S. Pat. No. 5,169,430; and U.S. Pat. No. 5,319,102; and those disclosed in Table 1.

TABLE 1

Herbicide Classification:
Herbicide Resistance Action Committee (HRAC)

I. ALS Inhibitors (WSSA Group 2)
    A. Sulfonylureas
        1. Azimsulfuron
        2. Chlorimuron-ethyl
        3. Metsulfuron-methyl
        4. Nicosulfuron
        5. Rimsulfuron
        6. Sulfometuron-methyl
        7. Thifensulfuron-methyl
        8. Tribenuron-methyl
        9. Amidosulfuron
        10. Bensulfuron-methyl
        11. Chlorsulfuron
        12. Cinosulfuron
        13. Cyclosulfamuron
        14. Ethametsulfuron-methyl
        15. Ethoxysulfuron
        16. Flazasulfuron
        17. Flupyrsulfuron-methyl
        18. Foramsulfuron
        19. Imazosulfuron
        20. Iodosulfuron-methyl
        21. Mesosulfuron-methyl
        22. Oxasulfuron
        23. Primisulfuron-methyl
        24. Prosulfuron
        25. Pyrazosulfuron-ethyl
        26. Sulfosulfuron
        27. Triasulfuron
        28. Trifloxysulfuron
        29. Triflusulfuron-methyl
        30. Tritosulfuron
        31. Halosulfuron-methyl
        32. Flucetosulfuron
    B. Sulfonylaminocarbonyltriazolinones
        1. Flucarbazone
        2. Procarbazone
    C. Triazolopyrimidines
        1. Cloransulam-methyl
        2. Flumetsulam
        3. Diclosulam
        4. Florasulam
        5. Metosulam
        6. Penoxsulam
        7. Pyroxsulam
    D. Pyrimidinyloxy(thio)benzoates
        1. Bispyribac
        2. Pyriftalid
        3. Pyribenzoxim
        4. Pyrithiobac
        5. Pyriminobac-methyl
    E. Imidazolinones
        1. Imazapyr
        2. Imazethapyr
        3. Imazaquin
        4. Imazapic
        5. Imazamethabenz-methyl
        6. Imazamox
II. Other Herbicides--Active Ingredients/
Additional Modes of Action
    A. Inhibitors of Acetyl CoA carboxylase
      (ACCase) (WSSA Group 1)
        1. Aryloxyphenoxypropionates
          ('FOPs')
          a. Quizalofop-P-ethyl
          b. Diclofop-methyl
          c. Clodinafop-propargyl
          d. Fenoxaprop-P-ethyl
          e. Fluazifop-P-butyl
          f. Propaquizafop
          g. Haloxyfop-P-methyl
          h. Cyhalofop-butyl
          i. Quizalofop-P-ethyl
        2. Cyclohexanediones ('DIMs')
          a. Alloxydim
          b. Butroxydim
          c. Clethodim TABLE 1-continued Herbicide Classification:
Herbicide Resistance Action Committee (HRAC)

- d. Cycloxydim
- e. Sethoxydim
- f. Tepraloxydim
- g. Tralkoxydim
B. Inhibitors of Photosystem II-HRAC
  Group C1/WSSA Group 5
  1. Triazines
     - a. Ametryne
     - b. Atrazine
     - c. Cyanazine
     - d. Desmetryne
     - e. Dimethametryne
     - f. Prometon
     - g. Prometryne
     - h. Propazine
     - i. Simazine
     - j. Simetryne
     - k. Terbumeton
     - l. Terbuthylazine
     - m. Terbutryne
     - n. Trietazine
  2. Triazinones
     - a. Hexazinone
     - b. Metribuzin
     - c. Metamitron
  3. Triazolinone
     - a. Amicarbazone
  4. Uracils
     - a. Bromacil
     - b. Lenacil
     - c. Terbacil
  5. Pyridazinones
     - a. Pyrazon
  6. Phenyl carbamates
     - a. Desmedipham
     - b. Phenmedipham
C. Inhibitors of Photosystem II--HRAC
  Group C2/WSSA Group 7
  1. Ureas
     - a. Fluometuron
     - b. Linuron
     - c. Chlorobromuron
     - d. Chlorotoluron
     - e. Chloroxuron
     - f. Dimefuron
     - g. Diuron
     - h. Ethidimuron
     - i. Fenuron
     - j. Isoproturon
     - k. Isouron
     - l. Methabenzthiazuron
     - m. Metobromuron
     - n. Metoxuron
     - o. Monolinuron
     - p. Neburon
     - q. Siduron
     - r. Tebuthiuron
  2. Amides
     - a. Propanil
     - b. Pentanochlor
D. Inhibitors of Photosystem II--HRAC
  Group C3/WSSA Group 6
  1. Nitriles
     - a. Bromofenoxim
     - b. Bromoxynil
     - c. Ioxynil
  2. Benzothiadiazinone (Bentazon)
     - a. Bentazon
  3. Phenylpyridazines
     - a. Pyridate
     - b. Pyridafol
E. Photosystem-I-electron diversion
  (Bipyridyliums) (WSSA Group 22)
  1. Diquat
  2. Paraquat
F. Inhibitors of PPO
  (protoporphyrinogen oxidase) (WSSA TABLE 1-continued Herbicide Classification:
Herbicide Resistance Action Committee (HRAC)

Group 14)
  1. Diphenylethers
     - a. Acifluorfen-Na
     - b. Bifenox
     - c. Chlomethoxyfen
     - d. Fluoroglycofen-ethyl
     - e. Fomesafen
     - f. Halosafen
     - g. Lactofen
     - h. Oxyfluorfen
  2. Phenylpyrazoles
     - a. Fluazolate
     - b. Pyraflufen-ethyl
  3. N-phenylphthalimides
     - a. Cinidon-ethyl
     - b. Flumioxazin
     - c. Flumiclorac-pentyl
  4. Thiadiazoles
     - a. Fluthiacet-methyl
     - b. Thidiazimin
  5. Oxadiazoles
     - a. Oxadiazon
     - b. Oxadiargyl
  6. Triazolinones
     - a. Carfentrazone-ethyl
     - b. Sulfentrazone
  7. Oxazolidinediones
     - a. Pentoxazone
  8. Pyrimidindiones
     - a. Benzfendizone
     - b. Butafenicil
  9. Others
     - a. Pyrazogyl
     - b. Profluazol
G. Bleaching: Inhibition of carotenoid
  biosynthesis at the phytoene desaturase
  step (PDS) (WSSA Group 12)
  1. Pyridazinones
     - a. Norflurazon
  2. Pyridinecarboxamides
     - a. Diflufenican
     - b. Picolinafen
  3. Others
     - a. Beflubutamid
     - b. Fluridone
     - c. Flurochloridone
     - d. Flurtamone
H. Bleaching: Inhibition of 4-
  hydroxyphenyl-pyruvate-dioxygenase (4-
  HPPD) (WSSA Group 28)
  1. Triketones
     - a. Mesotrione
     - b. Sulcotrione
  2. Isoxazoles
     - a. Isoxachlortole
     - b. Isoxaflutole
  3. Pyrazoles
     - a. Benzofenap
     - b. Pyrazoxyfen
     - c. Pyrazolynate
  4. Others
     - a. Benzobicyclon
I. Bleaching: Inhibition of carotenoid
  biosynthesis (unknown target) (WSSA
  Group 11 and 13)
  1. Triazoles (WSSA Group 11)
     - a. Amitrole
  2. Isoxazolidinones (WSSA Group 13)
     - a. Clomazone
  3. Ureas
     - a. Fluometuron
  3. Diphenylether
     - a. Aclonifen
J. Inhibition of EPSP Synthase
  1. Glycines (WSSA Group 9)
     - a. Glyphosate
     - b. Sulfosate TABLE 1-continued Herbicide Classification:
Herbicide Resistance Action Committee (HRAC)

K. Inhibition of glutamine synthetase
  1. Phosphinic Acids
    a. Glufosinate-ammonium
    b. Bialaphos
L. Inhibition of DHP (dihydropteroate) synthase (WSSA Group 18)
  1 Carbamates
    a. Asulam
M. Microtubule Assembly Inhibition (WSSA Group 3)
  1. Dinitroanilines
    a. Benfluralin
    b. Butralin
    c. Dinitramine
    d. Ethalfluralin
    e. Oryzalin
    f. Pendimethalin
    g. Trifluralin
  2. Phosphoroamidates
    a. Amiprophos-methyl
    b. Butamiphos
  3. Pyridines
    a. Dithiopyr
    b. Thiazopyr
  4. Benzamides
    a. Pronamide
    b. Tebutam
  5. Benzenedicarboxylic acids
    a. Chlorthal-dimethyl
N. Inhibition of mitosis/microtubule organization WSSA Group 23)
  1. Carbamates
    a. Chlorpropham
    b. Propham
    c. Carbetamide
O. Inhibition of cell division (Inhibition of very long chain fatty acids as proposed mechanism; WSSA Group 15)
  1. Chloroacetamides
    a. Acetochlor
    b. Alachlor
    c. Butachlor
    d. Dimethachlor
    e. Dimethanamid
    f. Metazachlor
    g. Metolachlor
    h. Pethoxamid
    i. Pretilachlor
    j. Propachlor
    k. Propisochlor
    l. Thenylchlor
  2. Acetamides
    a. Diphenamid
    b. Napropamide
    c. Naproanilide
  3. Oxyacetamides
    a. Flufenacet
    b. Mefenacet
  4. Tetrazolinones
    a. Fentrazamide
  5. Others
    a. Anilofos
    b. Cafenstrole
    c. Indanofan
    d. Piperophos
P. Inhibition of cell wall (cellulose) synthesis
  1. Nitriles (WSSA Group 20)
    a. Dichlobenil
    b. Chlorthiamid
  2. Benzamides (isoxaben (WSSA Group 21))
    a. Isoxaben
  3. Triazolocarboxamides (flupoxam)
    a. Flupoxam
Q. Uncoupling (membrane disruption): (WSSA Group 24)
  1. Dinitrophenols
    a. DNOC
    b. Dinoseb
    c. Dinoterb
R. Inhibition of Lipid Synthesis by other than ACC inhibition
  1. Thiocarbamates (WSSA Group 8)
    a. Butylate
    b. Cycloate
    c. Dimepiperate
    d. EPTC
    e. Esprocarb
    f. Molinate
    g. Orbencarb
    h. Pebulate
    i. Prosulfocarb
    j. Benthiocarb
    k. Tiocarbazil
    l. Triallate
    m. Vernolate
  2. Phosphorodithioates
    a. Bensulide
  3. Benzofurans
    a. Benfuresate
    b. Ethofumesate
  4. Halogenated alkanoic acids (WSSA Group 26)
    a. TCA
    b. Dalapon
    c. Flupropanate
S. Synthetic auxins (IAA-like) (WSSA Group 4)
  1. Phenoxycarboxylic acids
    a. Clomeprop
    b. 2,4-D
    c. Mecoprop
  2. Benzoic acids
    a. Dicamba
    b. Chloramben
    c. TBA
  3. Pyridine carboxylic acids
    a. Clopyralid
    b. Fluroxypyr
    c. Picloram
    d. Tricyclopyr
  4. Quinoline carboxylic acids
    a. Quinclorac
    b. Quinmerac
  5. Others (benazolin-ethyl)
    a. Benazolin-ethyl
T. Inhibition of Auxin Transport
  1. Phthalamates; semicarbazones (WSSA Group 19)
    a. Naptalam
    b. Diflufenzopyr-Na
U. Other Mechanism of Action
  1. Arylaminopropionic acids
    a. Flamprop-M-methyl/-isopropyl
  2. Pyrazolium
    a. Difenzoquat
  3. Organoarsenicals
    a. DSMA
    b. MSMA
  4. Others
    a. Bromobutide
    b. Cinmethylin
    c. Cumyluron
    d. Dazomet
    e. Daimuron-methyl
    f. Dimuron
    g. Etobenzanid
    h. Fosamine
    i. Metam
    j. Oxaziclomefone
    k. Oleic acid
    l. Pelargonic acid
    m. Pyributicarb (5) such microbiologically-active compositions-of-matter as are disclosed in U.S. Pat. No. 5,215,747;

(6) such pesticidally-active compositions-of-matter as those disclosed in U.S. Pat. No. 4,839,349; U.S. Pat. No. 5,010,068; U.S. Pat. No. 5,134,133; and U.S. Pat. Nos. 5,134,144 and 5,134,145; and (7) such plant growth regulant-active compositions-of-matter as those disclosed in U.S. Pat. No. 4,319,033; U.S. Pat. No. 4,857,649; U.S. Pat. No. 4,943,309; U.S. Pat. No. 5,039,332; U.S. Pat. No. 5,070,211; and U.S. Pat. No. 5,176,735.

Active ingredients that are suitable for use in the practice of the present invention, include but are not limited to, 5,6-dihydro-2-methyl-1,4-oxathiine-3-carboxanilide 4,4-dioxide, also known as oxycarboxin (common name) as well as by its trademark PLANTVAX®; 2,3-dihydro-2,2-dimethyl-7-benzofuranyl methyl carbamate, also known as carbofuran (its common name); methylcarbamic acid 2-(2-chloro-1-methoxy ethoxy)phenyl ester, also known as cloethocarb (its common name); 2-(4-chlorophenyl)-3-cyclopropyl-1-(1H-1,2,4-triazol-1-yl)-butan-2-ol, also known as cyprocnazole (its common name); pentachloronitrobenzene, also known as cyproconazole (its common name); pentachloronitrobenzene, also known as quintozene (common name) as well as by its trademark TERRACLOR®; 5-ethoxy-3-(trichloromethyl)-1,2,4-thiadiazole, also known as etridiazole (common name) as well as its trademark TERRAZOLE®; *Rhizobium sp; Penicillium bilajii; Bacillus subtilis;* β-(4-chlorophenoxy)-α-(1,1-dimethylethyl)-1H-1,2,4-triazole-1-ethanol, also known as triadimenol (common name) or by its trademark BAYTAN®; tetramethylthiuram disulfide, also known as thiram (common name); 2-(4-thiazolyl) benzimidazole, also known as thiabendazole (common name) as well as its abbreviation "TBZ"; (2-methyl[1,1'-biphenyl]-3-yl)methyl-3-(2-chloro-3,3,3 trifluoro-1-propenyl)-2,2-dimethylcyclopropane-carboxylate, also known as bifenthrin (common name); 1,2,3,4,5,6-hexachlorocyclo-hexane, gamma-isomer, also known as lindane (common name); N-(2,6-dimethylphenyl)-N-(methoxyacetyl)alanine methyl ester, also known as metalaxyl (common name); 1-[(6-chloro-3-pyridinyl)methyl]-N-nitro-2-imidazolidinimine, also known as imidacloprid (common name); and α-butyl-α'-(4-chlorophenyl)-1H-1,2,4-triazole propanenitrile, also known as myclobutanil (common name).

Insecticides such as abamectin, acephate, acetamiprid, amidoflumet (S-1955), avermectin, azadirachtin, azinphos-methyl, bifenthrin, bifenazate, buprofezin, carbofuran, cartap, chlorfenapyr, chlorfluazuron, chlorpyrifos, chlorpyrifos-methyl, chromafenozide, clothianidin, cyflumetofen, cyfluthrin, beta-cyfluthrin, cyhalothrin, lambda-cyhalothrin, cypermethrin, cyromazine, deltamethrin, diafenthiuron, diazinon, dieldrin, diflubenzuron, dimefluthrin, dimethoate, dinotefuran, diofenolan, emamectin, endosulfan, esfenvalerate, ethiprole, fenothiocarb, fenoxycarb, fenpropathrin, fenvalerate, fipronil, flonicamid, flubendiamide, flucythrinate, tau-fluvalinate, flufenerim (UR-50701), flufenoxuron, fonophos, halofenozide, hexaflumuron, hydramethylnon, imidacloprid, indoxacarb, isofenphos, lufenuron, malathion, metaflumizone, metaldehyde, methamidophos, methidathion, methomyl, methoprene, methoxychlor, metofluthrin, monocrotophos, methoxyfenozide, nitenpyram, nithiazine, novaluron, noviflumuron (XDE-007), oxamyl, parathion, parathion-methyl, permethrin, phorate, phosalone, phosmet, phosphamidon, pirimicarb, profenofos, profluthrin, pymetrozine, pyrafluprole, pyrethrin, pyridalyl, pyriprole, pyriproxyfen, rotenone, ryanodine, spinosad, spirodiclofen, spiromesifen (BSN 2060), spirotetramat, sulprofos, tebufenozide, teflubenzuron, tefluthrin, terbufos, tetrachlorvinphos, thiacloprid, thiamethoxam, thiodicarb, thiosultap-sodium, tralomethrin, triazamate, trichlorfon and triflumuron are useful in the methods of the invention.

Fungicides such as acibenzolar, aldimorph, amisulbrom, azaconazole, azoxystrobin, benalaxyl, benomyl, benthiavalicarb, benthiavalicarb-isopropyl, binomial, biphenyl, bitertanol, blasticidin-S, Bordeaux mixture (tribasic copper sulfate), boscalid/nicobifen, bromuconazole, bupirimate, buthiobate, carboxin, carpropamid, captafol, captan, carbendazim, chloroneb, chlorothalonil, chlozolinate, clotrimazole, copper oxychloride, copper salts such as copper sulfate and copper hydroxide, cyazofamid, cyflunamid, cyflufenamid, (53-3,5-dichloro-N-(3 chloro-1-ethyl-1-methyl-2-oxopropyl)-4-methylbenzamide (RH 7281), (S)-3,5-dihydro-5-methyl-2-(methylthio)-5-phenyl-3 (phenylamino)-4H-imidazol-4-one (RP 407213), cymoxanil, cyproconazole, cyprodinil, dichlofluanid, diclocymet, diclomezine, dicloran, diethofencarb, difenoconazole, dimethomorph, dimoxystrobin, diniconazole, diniconazole-M, dinocap, discostrobin, dithianon, dodemorph, dodine, econazole, etaconazole, edifenphos, epoxiconazole, ethaboxam, ethirimol, ethridiazole, famoxadone, fenamidone, fenarimol, fenbuconazole, fencaramid, fenfuram, fenhexamide, fenoxanil, fenpiclonil, fenpropidin, fenpropimorph, fentin acetate, fentin hydroxide, ferbam, ferfurazoate, ferimzone, fluazinam, fludioxonil, flumetover, flumorf/flumorlin (SYP-L190), fluopicolide, fluoxastrobin, fluquinconazole, fluquinconazole, flusilazole, flusulfamide, flutolanil, flutriafol, folpet, fosetyl-aluminum, fuberidazole, furalaxyl, furametapyr, hexaconazole, hymexazol, guazatine, imazalil, imibenconazole, iminoctadine, iodicarb, ipconazole, iprobenfos, iprodione, iprovalicarb, isoconazole, isoprothiolane, kasugamycin, kresoxim-methyl, mancozeb, mandipropamid, maneb, mapanipyrin, mefenoxam, mepronil, metalaxyl, metconazole, methasulfocarb, metiram, metominostrobin/fenominostrobin, mepanipyrim, metrafenone, miconazole, myclobutanil, neo-asozin (ferric methanearsonate), nicobifen (BAS 510), nuarimol, octhilinone, ofurace, orysastrobin, oxadixyl, oxolinic acid, oxpoconazole, oxycarboxin, paclobutrazol, penconazole, pencycuron, penthiopyrad, perfurazoate, phosphonic acid, phthalide, picobenzamid, picoxystrobin, polyoxin, probenazole, prochloraz, procymidone, propamocarb, propamocarb-hydrochloride, propiconazole, propineb, proquinazid, prothioconazole, pyraclostrobin, pryazophos, pyrifenox, pyrimethanil, pyrifenox, pyrolnitrine, pyroquilon, quinconazole, quinoxyfen, quintozene, silthiofam, simeconazole, spiroxamine, streptomycin, sulfur, tebuconazole, techrazene, tecloftalam, tecnazene, tetraconazole, thiabendazole, thifluzamide, thiophanate, thiophanate-methyl, thiram, tiadinil, tolclofos-methyl, tolyfluanid, triadimefon, triadimenol, triarimol, triazoxide, tridemorph, trimoprhamide tricyclazole, trifloxystrobin, triforine, triticonazole, uniconazole, validamycin, vinclozolin, zineb, ziram, and zoxamide are useful in the methods of the invention.

In addition, nematocides such as aldicarb, oxamyl and fenamiphos; bactericides such as streptomycin; acaricides such as amitraz, chinomethionat, chlorobenzilate, cyhexatin, dicofol, dienochlor, etoxazole, fenazaquin, fenbutatin oxide, fenpropathrin, fenpyroximate, hexythiazox, propargite, pyridaben and tebufenpyrad; and biological agents such as *Bacillus thuringiensis* including ssp. *aizawai* and *kurstakz, Bacillus thuringiensis* delta endotoxin, baculovirus, and entomopathogenic bacteria, virus and fungi are useful in the methods of the invention.

Molluscicides useful in the methods of the present invention include bromoacetamide, calcium arsenate, cloethocarb, copper acetoarsenite, copper sulfate, fentin, metaldehyde, methiocarb, niclosamide, pentachlorophenol, sodium pentachlorophenoxide, tazimcarb, thiodicarb, tralopyril, tributyltin oxide, trifenmorph, and trimethacarb.

A general reference for these agricultural protestants is The Pesticide Manual, 12th Edition, C. D. S. Tomlin, Ed., British Crop Protection Council, Farnham, Surrey, U.K., 2000.

Insecticides and acaricides for treating seeds include pyrethroids such as cypermethrin, cyhalothrin, cyfluthrin and beta-cyfluthrin, esfenvalerate, fenvalerate and tralomethrin; carbamates such as fenothicarb, methomyl, oxamyl and thiodicarb; neonicotinoids such as clothianidin, imidacloprid and thiacloprid; neuronal sodium channel blockers such as indoxacarb, insecticidal macrocyclic lactones such as spinosad, abamectin, avermectin and emamectin; y-aminobutyric acid (GABA) antagonists such as endosulfan, ethiprole and fipronil; insecticidal ureas such as flufenoxuron and triflumuron; juvenile hormone mimics such as diofenolan and pyriproxyfen; pymetrozine; and amitraz. Biological agents for use in the present methods include *Bacillus thuringiensis* and *Bacillus thuringiensis* delta endotoxin as well as naturally occurring and genetically modified viral insecticides including members of the family Baculoviridae as well as entomophagous fungi. Fungicide seed treatments include thiram, maneb, mancozeb and captan.

The term "growth regulator" shall be understood to mean a substance that regulates plant growth including growth regulators such as rooting stimulants, chemosterilants, semiochemicals, repellents, attractants, pheromones, feeding stimulants. In particular, growth regulators useful in the methods of the present invention include, but are not limited to, auxins, cytokinins, gibberellins, abscixic acid, jasmonates, ethylene, salicylic acid and brassinolides. Plant growth regulators include 1H-indole-3-acetic acid, 1H-indole-3-butanoic acid and 1-naphthaleneacetic acid and their agriculturally suitable salt, ester and amide derivatives, such as 1-napthaleneacetamide.

The term "carrier" as used herein shall in general be understood to mean an "adherent" or "adhesion agent", or "film former". The terms "adherent", "adhesion agent" and "film former" connote ingredients capable of causing a substance to adhere to a substrate. A "carrier" agent is a hydrocarbon oil having a boiling point of at least 150° C., wherein the "carrier" agent is present in an amount that is effective for reducing dusting off of the plant seed. Hydrocarbon oil carriers are selected from the group consisting of vegetable oil (such as canola oil), petroleum-based hydrocarbon oil, paraffinic/naphthenic hydrocarbon oil, mineral oil, and mixtures thereof. Other useful carriers can include liquids like water, oils and alcohols which are water soluble. Useful carriers can also include fillers like woodflours, clays, activated carbon, diatomaceous earth, fine-grain inorganic solids, calcium carbonate and the like. Clays and inorganic solids which may be used include calcium bentonite, kaolin, china clay, talc, perlite, mica, vermiculite, silicas, quartz powder, montmorillonite and mixtures thereof.

The film former or adhesive agent component of the seed treatment composition is composed preferably of an adhesive polymer that may be natural or synthetic and is without phytotoxic effect on the seed to be coated. The film former or sticking agent may be selected from polyvinyl acetates, polyvinyl acetate copolymers, hydrolyzed polyvinyl acetates, polyvinylpyrrolidone-vinyl acetate copolymer, polyvinyl alcohols, polyvinyl alcohol copolymers, polyvinyl methyl ether, polyvinyl methyl ether-maleic anhydride copolymer, waxes, latex polymers, celluloses including ethylcelluloses and methylcelluloses, hydroxy methylcelluloses, hydroxypropylcellulose, hydroxymethylpropylcelluloses, polyvinyl pyrrolidones, alginates, dextrins, malto-dextrins, polysaccharides, fats, oils, proteins, karaya gum, jaguar gum, tragacanth gum, polysaccharide gums, mucilage, gum arabics, shellacs, vinylidene chloride polymers and copolymers, soybean-based protein polymers and copolymers, lignosulfonates, acrylic copolymers, starches, polyvinylacrylates, zeins, gelatin, carboxymethylcellulose, chitosan, polyethylene oxide, acrylimide polymers and copolymers, polyhydroxyethyl acrylate, methylacrylimide monomers, alginate, ethylcellulose, polychloroprene and syrups or mixtures thereof. Film formers and adhesive agents include polymers and copolymers of vinyl acetate, polyvinylpyrrolidone-vinyl acetate copolymer and water-soluble waxes. The above-identified polymers include those known in the art and for example some are identified as Agrimer VA 6 and Licowax 30 KST. For large seeds the amount of film former or sticking agent is typically in the range of about 0.05 to 5% of the seed weight; for small seeds the amount is typically in the range of about 1 to 100%, but can be greater than 100% of seed weight in pelleting.

The term "surfactant"—which includes the terms "emulsifier" and "detergent"—as used herein means a composition of matter that either alters surface tension when dissolved in water or an aqueous solution or alters interfacial tension between immiscible liquids or a liquid and a solid. Surfactants suitable for purposes of the present invention are listed in McCutcheon's Emulsifiers & Detergents, at pages 287-310 of the North American Edition (1994), and in McCutcheon's Emulsifiers & Detergents, at pages 257-278 and 280 of the International Edition (1994), both published by MC Publishing Co. (McCutcheon Division) of Glen Rock, N.J. The Manufactuing Confection Publ. Co., Glen Rock, N.J., as well as Sisely and Wood, Encyclopedia of Surface Active Agents, Chemical Publ. Co., Inc., New York, 1964, and McCutcheon's Emulsifiers and Detergents and McCutcheon's Functional Materials (North America and International Editions, 2001), list surfactants and recommended uses.

In this regard, suitable surfactants include, but are not limited to, for example, ethoxylated alcohols, ethoxylated alkylphenols, ethoxylated sorbitan fatty acid esters, ethoxylated amines, ethoxylated fatty acids, esters and oils, dialkyl sulfosuccinates, alkyl sulfates, alkylaryl sulfonates, organosilicones, N,N-dialkyltaurates, glycol esters, phosphate esters, lignin sulfonates, naphthalene sulfonate, formaldehyde condensates, polycarboxylates, and block polymers including polyoxy-ethylene/polyoxypropylene block copolymers, carboxylated alcohol or alkylphenol ethoxylates, lignin and lignin derivatives, polyethylene glycols, silicone-based surfactants, sulfates and sulfonates, sulfonates of condensed naphthalenes, sulfonates of dodecyl and tridecylbenzenes, sulfonates of naphthalene and alkyl naphthalene, sulfosuccinamates, and sulfosuccinates and sulfosuccinate derivatives, highly water-soluble nonionic surfactants like Pluronic® F108, Brij® 78, and the like. Surfactants are selected from the group consisting of alkaryl sulfonates, diphenyl sulfonate derivatives, lignin and lignin derivatives, silicone-based surfactants, sulfonates of condensed naphthalenes, sulfonates of dodecyl/tridecyl benzene, sulfonates of naphthalene and alkyl naphthalene, sulfosuccinamates, sulfosuccinates, and mixtures thereof.

The term "dispersant" or "dispersing agent" as used herein connotes a surface-active agent that is added to suspending media to promote uniform suspension or separation of typically extremely fine solid particles, often of colloidal size. Dispersants suitable for purposes of the present invention are listed in McCutcheon's Functional Materials, at pages 122-142 of the North American Edition (1994), as well as in McCutcheon's Functional Materials, at pages 47-56 of the International Edition (1994), both published by MC Publishing Company (McCutcheon Division) of Glen Rock, N.J. In this regard, suitable dispersants include, but are not limited to, nonionic block copolymers, 46% tetramethyl decynediol on amorphous silica, anionic lignin surfactant formulations (including sodium salts of modified sulfonated lignin; and sodium salts of highly sulfonated lignin), polyvinyl pyrrolidone, sodium butyl naphthalene sulfonate (including diisobutyl sodium sulfosuccinate), dihexyl sodium sulfosuccinate, dioctyl ester of sodium sulfosuccinic acid (including dioctyl sodium sulfosuccinate), ditridecyl sodium sulfosuccinate, sodium dicyclohexyl sulfosuccinate, sodium dodecylbenzene sulfonate, polycarboxylate, sodium salt of polymeric carboxylic acid, polycarboxylate copolymers (including sodium salts of polymers made from the copolymerization of acrylic acid and maleic acid), polyacrylates (including anionic polyacrylate polymer such as polyacrylic acids and sodium polyacrylate), ammonium salt of polyacrylic acid, sodium alkyl naphthalene sulfonates (including sodium di-n-butyl naphthalene sulfonate and sodium di-isopropyl naphthalene sulfonate), lignosulfonates (including nonionic surfactant and sodium lignosulfonate blend; and anionic surfactant and sodium lignosulfonate blend), modified lignosulfonates, sodium and calcium lignosulfonates (including modified calcium lignosulfonate; modified sodium lignosulfonate; modified sodium-calcium lignosulfonate; highly purified calcium lignosulfonate; highly purified sodium lignosulfonate; highly purified partially desulfonated sodium lignosulfonate; sugar-free calcium and sugar-free sodium lignosulfonate; alkaline sugar-free sodium lignosulfonate; and the sodium salt of highly sulfonated kraft pine lignosulfonate), ammonium lignosulfonate, sugar-free ammonium lignosulfonate, sodium polynaphthalene sulfonate, sodium naphthalene sulfonic acid formaldehyde, sodium and calcium salts of polymerized substituted benzoid alkyl sulfonic acids, sodium neutralized condensed naphthalene sulfonic acids (including sodium salts of condensed naphthalene sulfonic acid and sodium salts of a condensed mononaphthalene sulfonic acid), ammonium salts of a condensed mononaphthalene sulfonic acid, sodium salts of polymerized alkyl naphthalene sulfonic acids, potassium salts of polymerized alkyl naphthalene sulfonic acids, calcium salts of polymerized alkyl substituted benzoid alkyl sulfonic acids, sodium salts of polymerized alkyl and substituted benzoid alkyl sulfonic acids, sodium salts of carboxylated polyelectrolytes, sulfonates of condensed naphthalenes, and neutralized sulfonates of naphthalene/formaldehyde condensates (including sodium sulfonates of naphthalene formaldehyde condensate and sodium salts of a sulfonated naphthalene formaldehyde condensate). Useful dispersants can include highly water-soluble anionic surfactants like Borresperse™ CA, Morwet® D425 and the like. Dispersants are selected from the group consisting of block polymers, alkylphenol ethoxylates, ethoxylated alcohols, ethoxylated alkylphenols, polyacrylic acid, propoxylated alkylphenols, sulfonated ethoxylated alkylphenols, lignin and lignin derivatives, tridecyl and dodecyl benzene sulfonic acid, and mixtures thereof.

The term "anti-caking agent" shall, in general, be understood to mean a substance used to improve the integrity of a paste and to lessen the likelihood of settling of a suspension. The term "anti-caking agent" shall, more particularly, be understood to mean a substance that promotes overall structure, body, or suspension properties, or that provides a rheological modification to the final desired product. Among the anti-caking agents that are suitable in the practice of the present invention may be listed: fumed silica (untreated or treated) synthetic calcium silicate, sodium polyalkyl naphthalene sulfonate, microcrystalline cellulose, sodium aluminosilicate, and the like.

The term "pigment," which includes the term "dye," as used herein means a composition of matter, usually in the form of a dry powder, that imparts color to another composition of matter or to a mixture. The term "dye" as used herein connotes an organic colorant, derived from a petroleum-based intermediate, to impart permanent color to a substrate.

The term "foam-control" agent or ingredient shall be understood to mean a substance that is used to reduce foaming. Foaming may result from the presence of such foam-inducing agents as proteins, gases, or nitrogenous materials. The presence of foam is generally undesirable because foam may interfere with processing. Foam-control agents are generally discussed at pages 430-447 in the Kirk-Othmer Encyclopedia of Chemical Technology, third edition, volume 7, published 1979 by John Wiley & Sons, Inc. Examples of conventional "foam-control" agents include but are not limited to the group consisting of certain organic phosphates, certain silicone fluids, certain sulfonated oils, and 2-octanol.

Additional foam-control agents suitable for purposes of the present invention include but are not limited to silicone-based powder (available from Calgene Chemical Inc. of Skokie, Ill.); mineral oil adsorbed onto silica substrate (available from Rhone Poulenc Corp. of Cranbury, N.J.); tallow soap; synthetic oil adsorbed onto hydrophilic silica (available from Ross Chemical of Fountain Inn, S.C.); silica-based powders; silicone defoamer; and various mixtures of silicone, silica, and polyethylene glycol 600 dioleate.

Useful formulations include liquids such as solutions (including emulsifiable concentrates), suspensions, emulsions (including microemulsions and/or suspoemulsions) and the like which optionally can be thickened into gels. Useful formulations further include solids such as dusts, powders, granules, pellets, tablets, films, and the like which can be water-dispersible ("wettable") or water-soluble.

Active ingredients can be (micro)encapsulated and further formed into a suspension or solid formulation; alternatively the entire formulation of active ingredient can be encapsulated (or "overcoated"). Encapsulation can control or delay release of the active ingredient. High-strength compositions are primarily used as intermediates for further formulation.

The formulations will typically contain effective amounts of active ingredient, diluent and surfactant within the following approximate ranges that add up to 100 percent by weight.

|  | Weight Percent | | |
| --- | --- | --- | --- |
|  | Active Ingredient | Diluent | Surfactant |
| Water-Dispersible and Water-soluble Granules, Tablets and Powders. | 5-90 | 0-94 | 1-15 |
| Suspensions, Emulsions, Solutions (including Emulsifiable Concentrates) | 5-50 | 40-95 | 0-15 |
| Dusts | 1-25 | 70-99 | 0-5 |
| Granules and Pellets | 0.01-99 | 5-99.99 | 0-15 |
| High Strength Compositions | 90-99 | 0-10 | 0-2 |

Typical solid diluents are described in Watkins et al., Handbook of Insecticide Dust Diluents and Carriers, 2nd Ed., Dorland Books, Caldwell, N.J. Typical liquid diluents are described in Marsden, Solvents Guide, 2nd Ed., Interscience, New York, 1950.

Solid diluents include, for example, clays such as bentonite, montmorillonite, attapulgite and kaolin, starch, sugar, silica, talc, mica, $TiO_2$, diatomaceous earth, urea, calcium carbonate, sodium carbonate and bicarbonate, and sodium sulfate. Liquid diluents include, for example, water, N,N-dimethylformamide, dimethyl 25 sulfoxide, N-alkylpyrrolidone, ethylene glycol, polypropylene glycol, propylene carbonate, dibasic esters, paraffins, alkylbenzenes, alkylnaphthalenes, oils of olive, castor, linseed, lung, sesame, corn, peanut, cotton-seed, soybean, rape-seed and coconut, fatty acid esters, ketones such as cyclohexanone, 2-heptanone, isophorone and 4-hydroxy-4-methyl-2-pentanone, and alcohols such as methanol, cyclohexanol, decanol, benzyl and tetrahydrofurfuryl alcohol.

Solutions, including emulsifiable concentrates, can be prepared by simply mixing the ingredients. Dusts and powders can be prepared by blending and, usually, grinding as in a 5 hammer mill or fluid-energy mill. Suspensions are usually prepared by wet-milling; see, for example, U.S. Pat. No. 3,060,084. Granules and pellets can be prepared by spraying the active material upon preformed granular carriers or by agglomeration techniques. See Browning, "Agglomeration", Chemical Engineering, Dec. 4, 1967, pp 147-48, Perry's Chemical Engineer's Handbook, 4th Ed., McGraw-Hill, New York, 1963, pages 8-57 and following, 10 and PCT Publication WO 91/13546. Pellets can be prepared as described in U.S. Pat. No. 4,172,714.

Water-dispersible and water-soluble granules can be prepared as taught in U.S. Pat. No. 4,144,050, U.S. Pat. No. 3,920,442 and DE 3,246,493. Tablets can be prepared as taught in U.S. Pat. No. 5,180,587, U.S. Pat. No. 5,232,701 and U.S. Pat. No. 5,208,030. Films can be prepared as taught in GB 2,095,558 and U.S. Pat. No. 3,299,566.

For further information regarding the art of formulation, see T. S. Woods, "The Formulator's Toolbox-Product Forms for Modern Agriculture" in Pesticide Chemistry and Bioscience, The Food-Environment Challenge, T. Brooks and T. R. Roberts, Eds., Proceedings of the 9th International Congress on Pesticide Chemistry, The Royal Society of Chemistry, Cambridge, 1999, pp. 120-133. See also U.S. Pat. No. 3,235,361, Col. 6, line 16 through 20 Col. 7, line 19 and Examples 10-41; U.S. Pat. No. 3,309,192, Col. 5, line 43 through Col. 7, line 62 and Examples 8, 12, 15, 39, 41, 52, 53, 58, 132, 138-140, 162-164, 166, 167 and 169-182; U.S. Pat. No. 2,891,855, Col. 3, line 66 through Col. 5, line 17 and Examples 1-4; Klingman, Weed Control as a Science, John Wiley and Sons, Inc., New York, 1961, pp 81-96; and Hance et al., Weed Control Handbook, 8th Ed., Blackwell Scientific Publications, Oxford, 1989.

The liquid seed treatment compositions useful in the methods of the present invention are preferably formulated in the form of an aqueous solution. The amount of added water utilized in the composition formation will depend upon the particular components and whether the components are in a dry form, in a liquid form or in solution when added to the formulation.

The liquid seed treatment composition useful in the methods of the present invention comprise an effective amount of one or more biologically active compounds or agents. As discussed, suitable additional compounds or agents include insecticides, fungicides, nematocides, bactericides, acaricides, other biologically active compounds or entomopathogenic bacteria, virus or fungi to form a multi-component seed treatment giving an even broader spectrum of agricultural utility.

As is known in the art, all formulations can contain minor amounts of additives to reduce foam, caking, corrosion, microbiological growth and the like, or thickeners to increase viscosity. The solvents used must not be phytotoxic to the seed; generally water is used, but other volatile solvents with low phytotoxicity such as methanol, ethanol, methyl acetate, ethyl acetate, heptyl acetate, octyl acetate, acetone, etc. may be employed alone or in combination.

Materials known as formulation aids may also be used in seed treatment coatings of the invention and are well known to those skilled in the art. These formulation aids assist in the production or process of seed treatment and include but are not limited to dispersants, surfactants, carriers, antifoams and dyes. One skilled in the art will appreciate that this is a non-exhaustive list of formulation aids and that other recognized materials may be used depending on the seed to be coated. Suitable examples of formulation aids include those listed herein and those listed in McCutcheon's 2001, Volume 2: Functional Materials, published by MC Publishing Company. The amount of formulation aids used may vary, but generally the weight of the components will be in the range of about 0.001 to 10000% of the seed weight, with the percentages above 100% being mainly used for pelleting small seed. For nonpelleted seed generally the amount of formulating aids is about 0.01 to 45% of the seed 20 weight and typically about 0.1 to 15% of the seed weight.

Other formulation types like wetted powders, solutions, suspoemulsions, emulsifiable concentrates and concentrated emulsions are particularly useful for applying film coatings to seeds.

The seed coating process of the present invention is not limited to thin film coating and may also include seed pelleting. The pelleting process typically increases the seed weight from 2 to 100 times and can be used to also improve the shape of the seed for use in mechanical seeders. Pelleting compositions generally contain a solid diluent, which is typically an insoluble particulate material, such as clay, ground limestone, powdered silica, etc. to provide bulk in addition to a binder such as an artificial polymer (e.g., polyvinyl alcohol, hydrolyzed polyvinyl acetates, polyvinyl methyl ether, polyvinyl methyl ether maleic anhydride copolymer, and polyvinylpyrrolidinone) or natural polymer (e.g., alginates, 30 karaya gum, jaguar gum, tragacanth gum, polysaccharide gum, mucilage). An advantage of the methods of treating seeds in the present invention is that as sufficient layers are being built up, the coat is also drying so that the pellets may be immediately graded without a prolonged drying period. A method for producing pellets is described in Agrow, The Seed Treatment Market, Chapter 3, PJB Publications Ltd., 1994.

The liquid composition to be applied to a small seed lot may be in the form of a seed treatment slurry comprising, water, a polymer, pesticides, fertilizers, nutrients, growth regulators and other biologically active ingredients. The liquid composition is applied to the seed by subjecting the seed lot to a dual asymmetrical centrifugal mixing motion. The seed lot to be treated and the liquid seed dressing are placed inside a covered container, which is then placed inside a mixing apparatus that works by spinning a mixing arm in one direction while the covered dressing container rotates in the opposite direction. The mixing apparatus works by spinning a high-speed mixing arm clockwise at speeds up to 3,500 rpm while a basket holding the covered dressing container rotates in a counterclockwise direction at approximately one-forth of the speed of the mixing arm. Specifically, for purposes of the methods of the present invention seed lots may be dressed in a FlackTek SpeedMixer™ DAC 150 FV(Z) available from FlackTek, Inc., 1708 Highway 11, Building G, Landrum, S.C. 29356 or alternatively from Hauschild, Waterkamp 1, 59075 Hamm, Germany.

For purposes of the present invention, the SpeedMixer™ must be used in accordance with the manufacturer's recommendations. Specifically, in order to maximize the benefits of the dual asymmetrical centrifugal mixing motion it is important that the containers holding the small seed lots are not overfilled. Overfilling prevents adequate seed movement within the container which insures uniform dressing of each seed in the seed lot. Carryover is eliminated because the containers are disposable. Depending on the number of seeds to be dressed an appropriately sized disposable container must be used. The SpeedMixer™ is designed to mix a maximum of 150 grams total weight and a minimum of 100 grams. It has a counter weight to balance the mixing container as it rotates. Accordingly, it is very important that 150 grams is not exceeded and that at least 100 grams is used in the mixing container. In practice the container/lid, holder and contents of the container should weigh between 100 to 150 grams. Ideally, treatments should be carried out in the 115 to 140 g range. Appropriate weight for use with the DAC 150 FVZ are provided in Table 2.

TABLE 2

| Cup + Holder Type | Wt of Empty Cup + Holder | Wt of Material Recommended | Actual Wt of Material Allowed |
|---|---|---|---|
| Max 100 | 50 g +/− 1 | 50-100 g | 50-100 g |
| Max 100 Heavy | 80 g +/− 3 | 20-70 g | 20-70 g |
| Max 60 | 85 g +/− 3 | 20-60 g | 15-65 g |
| Max 40 | 90 g +/− 3 | 15-40 g | 10-60 g |
| Max 20 | 120 g +/− 3 | 10-20 g | 0-41 g |
| Max 15 | 120 g +/− 3 | 5-15 g | 0-30 g |
| Max 10 | 128 g +/− 3 | 3-10 g | 0-22 g |
| Twin 10 | 117 g +/− 3 | 3-10 g | 0-16 g |

Using Table 2, one skilled in the art is readily able to calculate the number of seeds that can be treated in any of the disposable containers listed above. One skilled in the art must know the nominal or average weight of the seed to be dressed and the weight of the dressing material that will be used. For example, the nominal weight of corn seed is approximately 250 mg/seed, while the nominal or average weight of soybean seed is approximately 150 mg/seed. Accordingly, the total weight of the container and lid, the container holder, the seeds to be dressed and the dressing must fall within the parameters listed in Table 2 for the container size selected. Generally, the operator will select a container that is approximately one half full while also meeting the weight requirements of Table 2.

The following examples are presented by way of illustration, not by way of limitation.

EXPERIMENTAL

Example 1

Dressing Soybean Seed

Soybean seed was dressed with an experimental fungicide. A seed treatment slurry was made by mixing in a tube using a vortex mixer the following ingredients:

| Fungicide | 0.33 grams |
|---|---|
| Latex emulsion polymer | 0.33 grams |
| Water | 0.33 grams |

After mixing the ingredients together the treatment slurry was placed in a 60 Max cup with 125 (20 grams) soybean seeds and mixed in the SpeedMixer™ at 500 rpm for 30 sec. Upon observation of the dressed soybean seed the results indicated that the soybean seeds uniformly coated with the fungicide.

Example 2

Dressing Corn Seed

Corn seed was dressed with an experimental insecticide. A seed treatment slurry was made by mixing in a tube using a vortex mixer the following ingredients:

| Insecticide | 0.13 grams |
|---|---|
| Latex emulsion polymer | 0.68 grams |

After mixing the ingredients together the treatment slurry was placed in a 60 Max cup with 50 (12 grams) corn seeds and mixed in the SpeedMixer™ at 500 rpm for 30 sec. Upon observation of the dressed corn seed the results indicated that the corn seeds uniformly coated with the insecticide.

Example 3

Effects of Centrifugal Mixing on the Germination of Corn, Soybean and Sunflower Seed The effects of centrifugal mixing were examined for corn, soybean and sunflower seeds in the presence and absence of latex emulsion polymer. For the latex emulsion polymer treatment one hundred (100) seeds of each seed type were treated with five (5) drops of the latex emulsion polymer. Each seed type was dressed in the SpeedMixer™ for fifteen (15) seconds at various RPMs as indicated in Table 3. Seven (7) corn inbreds, six (6) soybean cultivars and four (4) sunflower cultivars were treated as indicated. Post dressing seventy two (72) plants from each 100 seed lot were planted in 72 well flats. Germination was observed at 7 days post planting.

TABLE 3

| Treatment | 5 drops of latex emulsion polymer per 100 seeds |
|---|---|
| 1 | Control - not subjected to SpeedMixer ™ |
| 2 | SpeedMixer ™ 750 RPMs |
| 3 | SpeedMixer ™ 1500 RPMs |
| 4 | SpeedMixer ™ 3000 RPMs |
| 5 | SpeedMixer ™ 750 RPMs + polymer |
| 6 | SpeedMixer ™ 1500 RPMs + polymer |
| 7 | SpeedMixer ™ 3000 RPMs + polymer |

The experimental results indicated that at the highest RPM level all seed types (corn inbreds, soybean cultivars and sunflower cultivars) tested showed some decrease in germination.

Example 4

Treatment Effects on the Germination of Corn, Soybean and Sunflower Seed

Corn, soybean and sunflower seed were dressed with a neonicotiniod insecticide and fludioxonil/mefenaxam fungicide active ingredients. The seeds were dressed with 75% the maximum label rate for the active ingredients. Seed treatment slurries were prepared and applied to the seeds using the SpeedMixer™. Specifically, corn seeds were dressed for 10 sec. at 1500 RPMs, soybean seeds were dressed for 5 sec. at 1500 RPMs and sunflower seeds were dressed for 5 sec. at 1500 RPMs. Seven (7) corn inbreds, six (6) soybean cultivars and four (4) sunflower cultivars were dressed. Germination was observed at 7 days post planting. The experimental results indicated all seed types (corn inbreds, soybean cultivars and sunflower cultivars) tested showed normal germination.

All publications, patents and patent applications mentioned in the specification are indicative of the level of those skilled in the art to which this invention pertains. All publications, patents and patent applications are herein incorporated by reference to the same extent as if each individual publication, patent or patent application was specifically and individually indicated to be incorporated by reference.

Although the foregoing invention has been described in some detail by way of illustration and example for purposes of clarity of understanding, it will be obvious that certain changes and modifications may be practiced within the scope of the embodiments.

That which is claimed:

1. A method of dressing a small seed lot, comprising:
   a) providing a small seed lot to be dressed;
   b) providing a liquid composition to be applied to said small seed lot; and
   c) applying a dual asymmetrical centrifugal mixing motion to said small seed lot and said liquid composition for a sufficient amount of time to surface coat said small seed lot wherein said dual asymmetrical centrifugal mixing motion causes said liquid composition to uniformly spread and subsequently dry onto each seed surface in said small seed lot.

2. The method of claim 1, wherein said small seed lot contains seeds from at least one plant selected from the group consisting of maize, wheat, barley, rice, sorghum, rye, millet, cotton, safflower, rape seed, sunflower, Brassica, alfalfa, palm, coconut, flax, castor, olive guar, locust bean, fenugreek, soybean, garden beans, cowpea, mungbean, lima bean, fava bean, lentils, and chickpea.

3. The method of claim 1, wherein said liquid composition further comprises an active ingredient selected from the group consisting of herbicides, insecticides, fungicides, bactericides, nematicides, molluscicides, or mixtures thereof.

4. The method of claim 1, wherein said liquid composition comprises a carrier, a surfactant, a dye, a pigment, a growth regulator, a dispersant, a film-forming polymer, an anti-caking agent, a foam-control agent, or mixtures thereof.

5. The method of claim 1, wherein said small seed lot comprises from 1 to 10,000 seeds.

6. The method of claim 1, wherein said dual asymmetrical centrifugal mixing motion is performed by an automatic mixer.

7. The method of claim 6, wherein said small seed lot and said liquid composition weighs up to 100 grams.

8. A method of dressing a small seed lot, said method comprising:
   receiving a small seed lot in a container;
   receiving a liquid composition in the container;
   covering the container;
   receiving the covered container in a basket of a mixing apparatus, the mixing apparatus also including a mixing arm; and
   effecting dual asymmetrical centrifugal mixing of the seed lot and liquid composition by rotating the mixing arm in one direction while rotating the basket containing the covered container in an opposite direction, thus resulting in surface coating of the seed lot.

9. The method of claim 8, wherein dual asymmetrical centrifugal mixing of the seed lot and the liquid composition is effected by rotating the mixing arm clockwise and rotating the basket containing the covered container counterclockwise.

10. The method of claim 8, wherein said small seed lot contains seeds from at least one plant selected from the group consisting of maize, wheat, barley, rice, sorghum, rye, millet, cotton, safflower, rape seed, sunflower, Brassica, alfalfa, palm, coconut, flax, castor, olive guar, locust bean, fenugreek, soybean, garden beans, cowpea, mungbean, lima bean, fava bean, lentils, and chickpea.

11. The method of claim 8, wherein said liquid composition further comprises an active ingredient selected from the group consisting of herbicides, insecticides, fungicides, bactericides, nematicides, molluscicides, or mixtures thereof.

12. The method of claim 8, wherein said liquid composition comprises a carrier, a surfactant, a dye, a pigment, a growth regulator, a dispersant, a film-forming polymer, an anti-caking agent, a foam-control agent, or mixtures thereof.

13. The method of claim 8, wherein said small seed lot comprises from 1 to 10,000 seeds.

14. The method of claim 8, wherein said small seed lot and said liquid composition weighs up to 100 grams.

15. A method of seed pelleting for a small seed lot, said method comprising:
   receiving a small seed lot in a container;
   receiving a pelleting composition in the container;
   covering the container;
   receiving the covered container in a basket of a mixing apparatus, the mixing apparatus also including a mixing arm; and
   effecting dual asymmetrical centrifugal mixing of the seed lot and pelleting composition by rotating the mixing arm in one direction while rotating the basket containing the covered container in an opposite direction.

16. The method of claim 15, wherein said pelleting composition contains a solid diluent.

17. The method of claim 16, wherein said solid diluent comprises clay selected from the group consisting of bentonite, montmorillonite, attapulgite and kaolin.

18. The method of claim 16, wherein said solid diluent comprises an insoluble particulate material and a binder.

19. The method of claim 18, wherein said binder comprises at least one of an artificial polymer and a natural polymer.

20. The method of claim 15, wherein said solid diluent is selected from the group consisting of clays, starch, sugar, silica, talc, mica, TiO2, diatomaceous earth, urea, calcium carbonate, sodium carbonate and bicarbonate, and sodium sulphate, or combinations thereof.

* * * * *